United States Patent
Unger et al.

(10) Patent No.: US 10,890,736 B2
(45) Date of Patent: Jan. 12, 2021

(54) ATHERMALIZED AND ACHROMATIZED MULTISPECTRAL OPTICAL SYSTEMS AND METHODS OF DESIGNING SAME

(71) Applicant: Rochester Precision Optics, LLC, West Henrietta, NY (US)

(72) Inventors: Blair Lane Unger, West Henrietta, NY (US); Jamie Leigh Ramsey, West Henrietta, NY (US)

(73) Assignee: Rochester Precision Optics, LLC, West Henrietta, NY (US)

( * ) Notice: Subject to any disclaimer, the term of this patent is extended or adjusted under 35 U.S.C. 154(b) by 576 days.

(21) Appl. No.: 15/689,770

(22) Filed: Aug. 29, 2017

(65) Prior Publication Data

US 2018/0067280 A1 Mar. 8, 2018

Related U.S. Application Data

(60) Provisional application No. 62/380,506, filed on Aug. 29, 2016.

(51) Int. Cl.
*G02B 9/34* (2006.01)
*G02B 7/02* (2006.01)
(Continued)

(52) U.S. Cl.
CPC ............ *G02B 9/34* (2013.01); *G02B 7/021* (2013.01); *G02B 13/146* (2013.01);
(Continued)

(58) Field of Classification Search
CPC .... G02B 13/146; G02B 13/14; G02B 13/008; G02B 13/0055; G02B 13/006;
(Continued)

(56) References Cited

U.S. PATENT DOCUMENTS 10,330,929 B2 * 6/2019 Sitter, Jr. ............. G02B 13/146
2014/0268315 A1 9/2014 Carlie

OTHER PUBLICATIONS

Smith, Warren J., [Modern Optical Engineering, Third Edition], 2000. McGraw-Hill, New York, 411-412,.
(Continued)

Primary Examiner — Alicia M Harrington
(74) Attorney, Agent, or Firm — Bond, Schoeneck & King, PLLC; Jeffrey Powers

(57) ABSTRACT

An optical system for multispectral, infrared light having at least three element. Such systems include a first element having a first thermal glass constant-instantaneous Abbe number product and a first peak wavelength, and a second glass element having a second thermal glass constant-instantaneous Abbe number product and a second peak wavelength. The first product and the second product differing from one another by greater than 0.0075 $K^{-1}$. The first peak wavelength and the second peak wavelength are greater than 6 microns. The system also includes a third glass element having a third product and a third peak wavelength, the third wavelength differing from the first wavelength and the second by at least 3 microns, the third wavelength being in the range 1-5 microns. The sum of the first, second and third products being about zero. A doublet for transmitting multispectral light is also disclosed, as well as methods of designing such lenses.

13 Claims, 11 Drawing Sheets

(51) Int. Cl.
    *G02B 27/00*    (2006.01)
    *G02B 13/14*    (2006.01)
(52) U.S. Cl.
    CPC ..... *G02B 27/0012* (2013.01); *G02B 27/0025* (2013.01); *G02B 27/0062* (2013.01)
(58) Field of Classification Search
    CPC .............. G02B 19/009; G02B 27/0062; G02F 2203/58; C03C 4/10
    See application file for complete search history.

(56) References Cited

OTHER PUBLICATIONS

Rayces et al., "Thermal compensation of infrared achromatic objectives with three optical materials" 1990, SPIE vol. 1354. International Lens Design Conference.

Kohler et all, "Design of Athermal Lens Systems," [Space optics], B.J. Thompson and R.R. Shannon editors, 1974 pp. 116-153, National Academy of Sciences.

Bayya et al. "Design and fabrication of multispectral optics using expanded glass map", 2015. Proc. SPIE 9451, Infrared Technology and Applications XLI.

Ramsey et al. "Athermalization and Achromatization of Multiband Optics using Instantaneous Abbe Number". SPIE. Submitted Aug. 15, 2016. pp. 1-9.

Ramsey et al. "Athermalization and Achromatization of Multiband Optics using Instantaneous Abbe Number". Abstract submitted on or about Jan. 21, 2016.

Carlie, Nathan A. "Instantaneous Dispersion: A Window into Property Relationships for Optical Glass". International Journal of Applied Glass Science 2015. pp. 364-374. The American Ceramic Society and Wiley Periodicals, Inc.

Rayces et al. "Differential Equation for Normal Glass Dispersion and Evaluation of the Secondary Spectrum". Applied Optics, Apr. 1, 1999. vol. 38, No. 10.

Carlie, Nathan, "Broadband Infrared Optical Materials and Methods", Classic Optics Jun. 2014; 2 pages.

* cited by examiner

|  | Surface | Radius (mm) | Thickness (mm) | Material |
|---|---|---|---|---|
| Element 1 | Sphere | -20.3244 | 3.5 | IRG2 |
|  | Asphere 1 | -24.9605 | 8.434229656 | AIR |
| Element 2 | Sphere | -123.971 | 3 | NRL13 |
|  | Asphere 2 | 167.1707 | 0.545162389 | AIR |
|  | Sphere | 1.00E+18 | 0 | AIR |
| Element 3 | Sphere | 48.17887 | 3.5 | NRL-4 |
|  | Asphere | -76.1441 | 0 | AIR |
|  | Sphere | 1.00E+18 | 8 | AIR |
| Window | Sphere | 1.00E+18 | 2 | ZnSe |
| stop | Sphere | 1.00E+18 | 1 | AIR |
|  | Sphere | 1.00E+18 | 0 | AIR |
|  |  | 1.00E+18 | 25 | AIR |
|  |  | 1.00E+18 | 0 | AIR |
|  |  | 1.00E+18 | 0 | AIR |

| Asphere 1 | cooeff | Asphere 2 | cooef |
|---|---|---|---|
| Conic Constant (K) | 0.00E+00 | Conic Constant (K) | 0 |
| 4th Order Coefficient (A) | 1.11E-05 | 4th Order Coefficient (A) | -6.11E-05 |
| 6th Order Coefficient (B) | -5.25E-08 | 6th Order Coefficient (B) | 3.90E-07 |
| 8th Order Coefficient (C) | 1.59E-10 | 8th Order Coefficient (C) | -1.06E-09 |
| 10th Order Coefficient (D) | -7.74E-13 | 10th Order Coefficient (D) | 6.88-12 |

FIG. 6

| Triplet Combinations SWIR/MWIR | | |
|---|---|---|
| IRG23 | NRL4 | NRL13 |
| IRG23 | NRL4 | IRG28 |
| IRG23 | NRL4 | 1RG27 |
| IRG23 | NRL4 | ZnS |
| IRG23 | NRL4 | NRL1 |
| IRG23 | NRL8 | NRL13 |
| IRG23 | NRL8 | IRG28 |
| IRG23 | NRL8 | IRG27 |
| IRG23 | NRL8 | ZnS |
| IRG23 | NRL8 | NRL1 |
| IRG22 | NRL5 | BaF2 |
| IRG23 | NRL4 | BaF2 |
| IRG23 | NRL8 | BaF2 |
| IRG22 | NRL5 | NRL13 |
| IRG22 | NRL5 | IRG28 |
| IRG22 | NRL5 | IRG27 |
| IRG22 | NRL5 | ZnS |
| IRG22 | NRL5 | NRL1 |
| GaAs | NRL5 | NRL13 |
| GaAs | NRL5 | IRG28 |
| GaAs | NRL5 | IRG27 |
| GaAs | NRL5 | ZnS |
| GaAs | NRL5 | NRL1 |

| Quadruple Combinations SWIR/MWIR | | | |
|---|---|---|---|
| IRG23 | NRL4 | NRL13 | IRG26 |
| IRG23 | NRL4 | IGxB | IRG26 |
| IRG23 | NRL4 | IGxA | IRG26 |
| IRG23 | NRL4 | ZnS | IRG26 |
| IRG23 | NRL4 | NRL1 | IRG26 |
| IRG23 | NRL8 | NRL13 | IRG26 |
| IRG23 | NRL8 | IGxB | IRG26 |
| IRG23 | NRL8 | IGxA | IRG26 |
| IRG23 | NRL8 | ZnS | IRG26 |
| IRG23 | NRL8 | NRL1 | IRG26 |
| IRG22 | NRL5 | CaF2 | IRG26 |
| IRG22 | NRL5 | BaF2 | IRG26 |
| IRG23 | NRL4 | CaF2 | IRG26 |
| IRG23 | NRL4 | BaF2 | IRG26 |
| IRG23 | NRL8 | CaF2 | IRG26 |
| IRG23 | NRL8 | BaF2 | IRG26 |
| IRG23 | NRL4 | NRL13 | IRG24 |
| IRG23 | NRL4 | IGxB | IRG24 |
| IRG23 | NRL4 | IGxA | IRG24 |
| IRG23 | NRL4 | ZnS | IRG24 |
| IRG23 | NRL4 | NRL1 | IRG24 |
| IRG23 | NRL8 | NRL13 | IRG24 |
| IRG23 | NRL8 | IGxB | IRG24 |
| IRG23 | NRL8 | IGxA | IRG24 |
| IRG23 | NRL8 | ZnS | IRG24 |
| IRG23 | NRL8 | NRL1 | IRG24 |
| IRG22 | NRL5 | CaF2 | IRG24 |
| IRG22 | NRL5 | BaF2 | IRG24 |
| IRG23 | NRL4 | CaF2 | IRG24 |
| IRG23 | NRL4 | BaF2 | IRG24 |
| IRG23 | NRL8 | CaF2 | IRG24 |
| IRG23 | NRL8 | BaF2 | IRG24 |
| Si | NRL4 | NRL13 | IRG26 |
| Si | NRL4 | IGxB | IRG26 |

FIG. 7

| | | | |
|---|---|---|---|
| Si | NRL4 | IGxA | IRG26 |
| Si | NRL4 | ZnS | IRG26 |
| Si | NRL4 | NRL1 | IRG26 |
| Si | NRL8 | NRL13 | IRG26 |
| Si | NRL8 | IGxB | IRG26 |
| Si | NRL8 | IGxA | IRG26 |
| Si | NRL8 | ZnS | IRG26 |
| Si | NRL8 | NRL1 | IRG26 |
| Si | NRL5 | CaF2 | IRG26 |
| Si | NRL5 | BaF2 | IRG26 |
| Si | NRL4 | CaF2 | IRG26 |
| Si | NRL4 | BaF2 | IRG26 |
| Si | NRL8 | CaF2 | IRG26 |
| Si | NRL8 | BaF2 | IRG26 |
| Si | NRL4 | NRL13 | IRG24 |
| Si | NRL4 | IGxB | IRG24 |
| Si | NRL4 | IGxA | IRG24 |
| Si | NRL4 | ZnS | IRG24 |
| Si | NRL4 | NRL1 | IRG24 |
| Si | NRL8 | NRL13 | IRG24 |
| Si | NRL8 | IGxB | IRG24 |
| Si | NRL8 | IGxA | IRG24 |
| Si | NRL8 | ZnS | IRG24 |
| Si | NRL8 | NRL1 | IRG24 |
| Si | NRL5 | CaF2 | IRG24 |
| Si | NRL5 | BaF2 | IRG24 |
| Si | NRL4 | CaF2 | IRG24 |
| Si | NRL4 | BaF2 | IRG24 |
| Si | NRL8 | CaF2 | IRG24 |
| Si | NRL8 | BaF2 | IRG24 |

*FIG. 7 Con't*

ATHERMALIZED AND ACHROMATIZED MULTISPECTRAL OPTICAL SYSTEMS AND METHODS OF DESIGNING SAME

RELATED APPLICATIONS

This application claims the benefit of the filing date of U.S. Provisional Patent Application Ser. No. 62/380,506, filed Aug. 29, 2016, titled METHOD FOR ATHERMALIZATION AND ACHROMATIZATION OF MULTIBAND OPTICS USING INSTANTANEOUS ABBE NUMBER which is hereby incorporated by reference in its entirety.

FIELD

Athermalized and achromatized multispectral optical systems and methods of designing same, and in particular, athermalized and achromatized multispectral infrared optical systems and methods of designing same.

BACKGROUND

Infrared (IR) light is conventionally divided into the following wavebands: shortwave IR (SWIR) having wavelengths from about 1-2 microns; midwave IR (MWIR) having wavelengths from about 3-5 microns; and longwave IR (LWIR) having wavelengths from about 8-12 microns.

New detector technologies have enabled multispectral IR detection (i.e., detection spanning multiple wavebands) through a common aperture. Detector systems using such detectors provide significant advantages in size, weight and power. Availability of such detectors has spurred significant interest in multispectral optics to be used in an optical system to gather light (e.g., SWIR/MWIR light or MWIR/LWIR light) through an aperture and onto the detector.

To achieve suitable imaging performance over a desired wavelength range and a desired temperature range, it is desirable that a design (including selection of materials) be achromatized and athermalized. Due to the relatively small number of materials available in the infrared regions, athermalization and achromatization using optics (in particular passive optics, i.e., without the use of mechanical devices) can be challenging even over a single IR waveband. The challenges become greater in the case of multispectral optics.

Smith, Warren J., [Modern Optical Engineering, Third Edition], McGraw-Hill, New York, 411-412, (2000), Rayces, J. L., Lebich, L., "Thermal compensation of infrared achromatic objectives with three optical materials" SPIE Vol. 1354 International Lens Design Conference (1990), and Kohler, H. and Strahle, F., "Design of Athermal Lens Systems," [Space optics], B. J. Thompson and R. R. Shannon editors, pp. 116-153, National Academy of Sciences, (1974) describe graphical techniques using a $\gamma^* \upsilon$ vs. $\upsilon$ diagram for selecting materials suitable for achromatizing doublets that are athermal. Those techniques utilize the Abbe number ($\upsilon$) which is determined by a material's change in index of refraction as a function of wavelength of light, and the thermal glass constant ($\gamma$) (see equation 1 below) which is a function of the coefficient of thermal expansion of the material and the material's change in index of refraction as a function of temperature.

Methods, such as those identified above, are useful for selection of materials for a single waveband; however, these methods have been ineffective for selecting materials for use in multispectral systems.

SUMMARY

Recently, new materials have been developed to expand the glass map throughout the SWIR, MWIR, and LWIR regions (see Carlie, N., "Broadband Infrared Optical Materials and Methods", OSA Technical Digest, paper IM2B.5 (referred to herein as Carlie); also see Bayya, S., Gibson, D., Nguyen V., Sanghera J., Mikhail K., "Design and fabrication of multispectral optics using expanded glass map", Proc. SPIE 9451, Infrared Technology and Applications XLI, (2015)). These materials suggest that better athermalization and achromatization over single and multiple wavebands may be achieved for lens systems for use with common aperture detectors.

As set forth in Carlie, a variation of the Abbe number ($\upsilon$), known as the instantaneous Abbe number (referred to herein as instantaneous $\upsilon$ or $\upsilon'$), is useful in achromatizing multispectral optical systems. While techniques have been proposed for achieving achromatization of multispectral systems, achieving athermalization of such systems has been limited. For example, techniques have included empirically selecting materials having values centered around the thermal constant of the material that forms the housing in which the optical system is to be maintained.

To overcome challenges in making effective use of the new materials, the inventors apply instantaneous Abbe numbers as set forth below, to achieve a systematic way of selecting materials, to reliably achieve optical systems that are both achromatized and athermalized over a multispectral range of wavelengths.

A first aspect of the present invention is directed to an optical system for transmitting infrared light, comprising a first glass element having a first thermal glass constant-instantaneous Abbe number product and a first peak wavelength and a second glass element having a second thermal glass constant-instantaneous Abbe number product and a second peak wavelength. The first thermal glass constant-instantaneous Abbe number product and the second thermal glass constant-instantaneous Abbe number product differ from one another by greater than 0.0075 K$^{-1}$. Each of the first peak wavelength and the second peak wavelength is greater than about 6 microns. A third glass element hays a third thermal glass constant-instantaneous Abbe number product and a third peak wavelength, the third peak wavelength differing from the first peak wavelength and the second wavelength by at least 3 microns. The third peak wavelength is in the range 1 to 5 microns. The sum of the first thermal glass constant-instantaneous Abbe number product, the second thermal glass constant-instantaneous Abbe number product, and the third thermal glass constant-instantaneous Abbe number product is about zero.

In some embodiments, at least two of the first element, the second element and the third element are cemented together or fused.

In some embodiments, the first peak wavelength and the second peak wavelength are both less than 10 microns.

In some embodiments, the system further comprises a fourth glass element having a fourth thermal glass constant-instantaneous Abbe number product and a fourth peak wavelength, the fourth thermal glass constant-instantaneous Abbe number product being equal to about zero.

Another aspect of the invention is directed to a method of designing an optical system for transmitting infrared light in a selected wavelength region, comprising: a) selecting a first glass material having a first thermal glass constant-instantaneous Abbe number product and a first peak wavelength; b) selecting a second glass material having a second thermal glass constant-instantaneous Abbe number product and a second peak wavelength, the first thermal glass constant-instantaneous Abbe number product and the second thermal glass constant-instantaneous Abbe number product differing from one another by about 0.0075 K$^{-1}$, each of the first peak wavelength and the second peak wavelength being greater than about 6 microns; and c) selecting a third glass material having a third thermal glass constant-instantaneous Abbe number product and a third peak wavelength, the third peak wavelength differing from the first peak wavelength and the second wavelength by at least 3 microns, the third peak wavelength being in the range 1 to 5 microns, the sum of the first thermal glass constant-instantaneous Abbe number product, the second thermal glass constant-instantaneous Abbe number product, and the third thermal glass constant-instantaneous Abbe number product being about zero.

The method may further comprise selecting curvatures and thicknesses for each of the first material, the second material and the third material to achieve a first glass element, a second glass element and a third glass element.

In some instances an air gap between at least two of the first element, the second element and the third element may be selected to be equal to zero.

In some instances the steps a)-c) are performed with each of the first material, the second material and the third material being selected using a map where each of a set of materials is displayed as γ*instantaneous υ vs. peak wavelength.

The method may further comprise generating a glass map including materials that transmit light in the selected wavelength region, the materials plotted according to γ*instantaneous υ and peak wavelength.

The method may further comprise selecting a fourth glass material having a fourth thermal glass constant-instantaneous Abbe number product and a fourth peak wavelength, the fourth thermal glass constant-instantaneous Abbe number product having a value of about zero.

Another aspect of the invention is directed to an optical system for transmitting infrared light including a first glass element having a first thermal glass constant-instantaneous Abbe number product and a first peak wavelength greater than about 6 microns, and a second glass element having a second thermal glass constant-instantaneous Abbe number product. The second element made of material having a second peak wavelength in the range 1 to 5 microns. The first thermal glass constant-instantaneous Abbe number product and the second thermal glass constant-instantaneous Abbe number product differ from one another by greater than 0.0025 K$^{-1}$, and the second peak wavelength differs from the first peak wavelength by at least 3 microns. The sum of the first thermal glass constant-instantaneous Abbe number product and the second thermal glass constant-instantaneous Abbe number product is about zero.

In some embodiments, the first element and the second element are cemented together or fused.

In some embodiments, the peak wavelength of the first element is less than 10 microns.

These and other aspects of the present invention will become apparent upon a review of the following detailed description and the claims appended thereto.

The term "element" is defined herein to mean an optical component of a selected material composition shaped to have an optical power.

BRIEF DESCRIPTION OF THE DRAWINGS

FIG. 6 is a chart showing details of an example of an achromatized and athermalized optical system according to aspects of the present invention; and FIG. 7 is a chart showing combinations of materials suitable for forming optical systems according to aspects of the present invention.

DETAILED DESCRIPTION

Figure 1A:
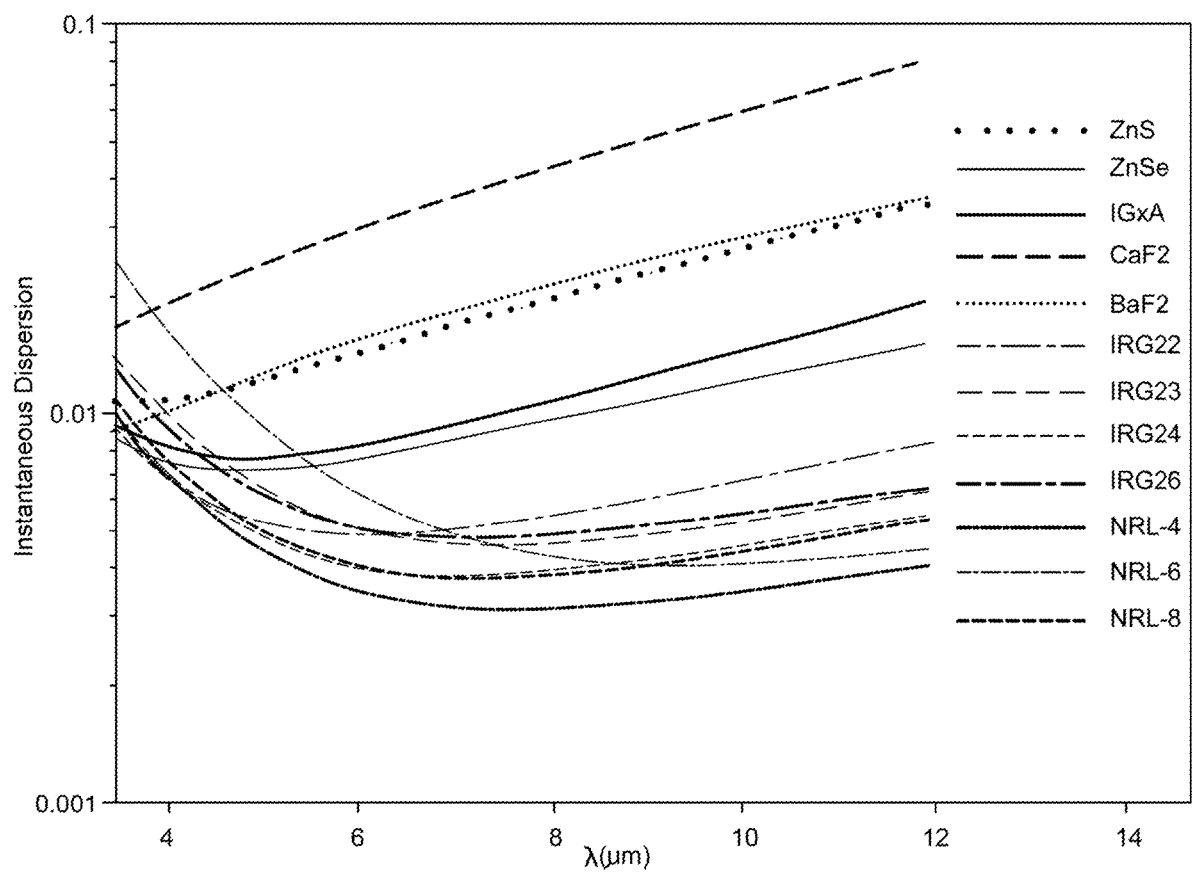
FIGS. 1a and 1b are graphical representations of instantaneous dispersion and Abbe number a function of wavelength, respectively.

The invention will be further illustrated with reference to the following specific examples. It is understood that these examples are given by way of illustration and are not meant to limit the disclosure or the claims to follow.

A thermal glass constant is a factor used to determine fractional change in the focal length over temperature for each element to be used in the design. The thermal glass constant includes both the dn/dT of the desired optical material and it's coefficient of thermal expansion.

A thermal glass constant is defined as:

$$\gamma = \frac{\frac{dn}{dT}}{(n-1)} - \alpha \qquad \text{Equation 1}$$

where n is the index of refraction, α is the coefficient of thermal expansion of the optical material, and dn/dT is the change in index over temperature.

A set of linear equations can be used to describe the athermalization and achromatization of an optical system. As set forth below, in single band optical systems, selection of materials to achieve athermalization and achromatization can be determined by solving a set of three linear equations.

The total optical power of the optical system is defined as:

$$\sum_{i=1}^{K} \phi_i = \phi_T \qquad \text{Equation 2}$$

where $\phi_i$ is the optical power of a single element and $\phi_T$ is the total optical power.

The thermal compensation of the optical system is defined as:

$$\sum_{i=1}^{K} \gamma \phi_i = -\alpha_M \phi_T \qquad \text{Equation 3}$$

where $\alpha_M$ is the thermal expansion of the housing material. A goal is to match the thermal focal shift caused by the optical elements to thermal expansion of the housing.

In order to achromatize the lens system, it is desirable to satisfy the following equation:

$$\sum_{i=1}^{K}\left(\frac{\phi_i}{v_i}\right) = 0 \qquad \text{Equation 4}$$

where $v_i$ is the Abbe number of each element.

Solving this system of linear equations allows the optical power of three elements to be expressed in terms of the Abbe number and the thermal glass constant.

The powers of each element of the optical system are expressed as follows:

$$\phi_1 = \frac{\phi_T v_1 (\gamma_2 v_2 - \gamma_3 v_3)}{D} \qquad \text{Equation 5(a)}$$

$$\phi_2 = \frac{\phi_T v_2 (\gamma_3 v_3 - \gamma_1 v_1)}{D} \qquad \text{Equation 5(b)}$$

$$\phi_3 = \frac{\phi_T v_3 (\gamma_1 v_1 - \gamma_2 v_2)}{D} \qquad \text{Equation 5(c)}$$

where D is the determinant of the set of linear equations and it is defined as:

$$D = v_1(\gamma_2 v_2 - \gamma_3 v_3) + v_2(\gamma_3 v_3 - \gamma_1 v_1) + v_3(\gamma_1 v_1 - \gamma_2 v_2) \qquad \text{Equation 6}$$

and not equal to zero.

Conventionally, to achieve athermalization and achromatization for narrow band optical systems, the above equations which implement conventional Abbe number and thermal characteristics and corresponding glass maps have been used to select material for use in the optical systems. To facilitate selection of materials, conventional glass maps have plotted materials on the map using a product of thermal glass constant ($\gamma$) and the conventional Abbe number ($v$) on the vertical axis, and convention Abbe number ($v$) along the horizontal axis. Such techniques have proven ineffective in designing multispectral systems.

It will be appreciated that due to the fact that a crown in one waveband can become a flint in another. Achromatization is more difficult in broadband systems than single band systems. As set forth above, one method to account for index of refraction variations across a multispectral range is to use the instantaneous value of the dispersion and from there extract the instantaneous Abbe number as defined in Carlie.

Instantaneous Abbe number is determined by taking the derivative of the index of refraction over wavelength.

The index of refraction is defined as:

$$n(\lambda)^2 - 1 = \sum_i \frac{B_i \lambda^2}{(\lambda^2 - C_i)} \qquad \text{Equation 7}$$

Upon taking the derivative to define the instantaneous dispersion the following equation is attained.

$$\frac{dn}{d\lambda} = \frac{-2}{n} \sum_i \frac{B_i C_i \lambda}{(\lambda^2 - C_i)^2} \qquad \text{Equation 8}$$

From here it is now possible to calculate the instantaneous Abbe number $v'$ as a function of wavelength.

Instantaneous Abbe Number is defined as:

$$v' = -\frac{1}{2} \frac{n(\lambda) - 1}{(dn(\lambda)/d\lambda)} \qquad \text{Equation 9}$$

Figure 1B:
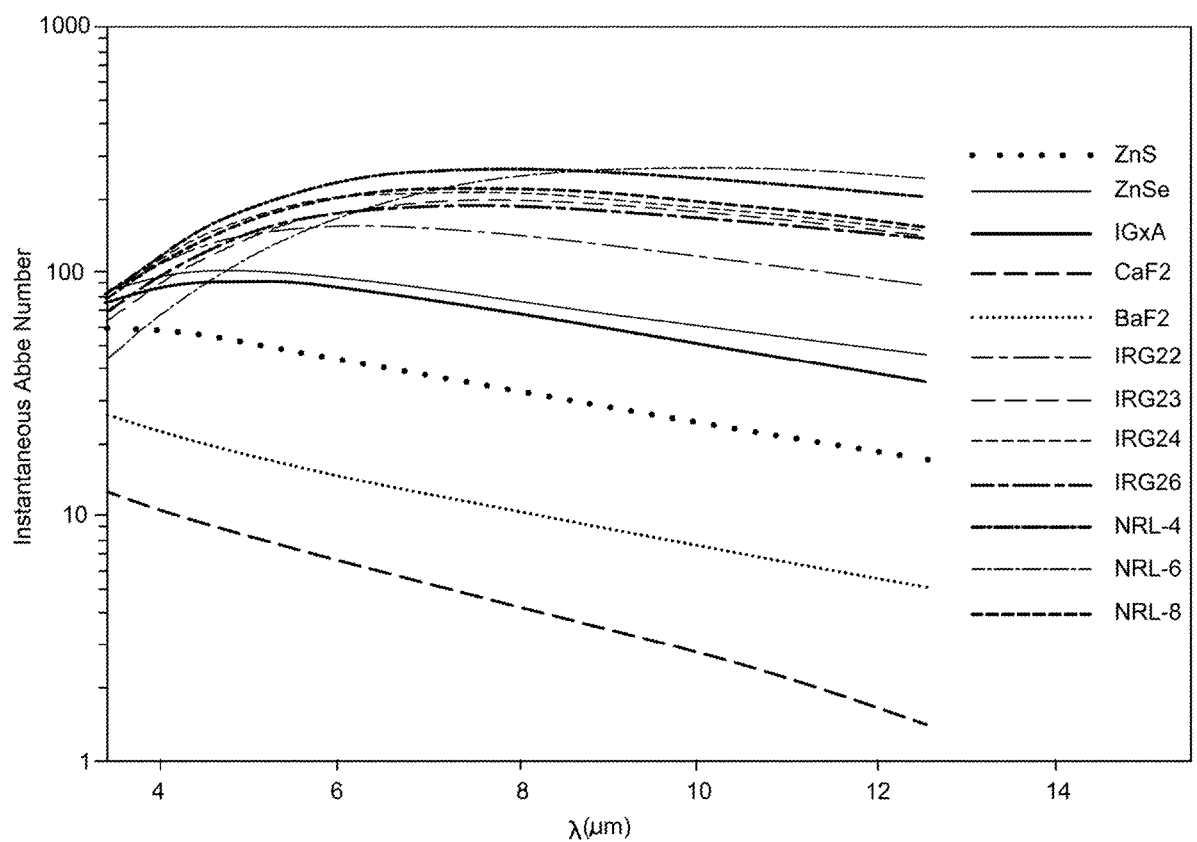

Using these equations, it is possible to plot instantaneous dispersion and Abbe number as a function of wavelength for various materials. FIGS. 1a and 1b are graphical representations of instantaneous dispersion and Abbe number a function of wavelength, respectively.

From FIGS. 1a and 1b, a trend in the dispersion and the Abbe number can be extracted. In particular, the location of the minimum dispersion wavelength occurs where the second derivative of the index curve (i.e., the first derivative of the dispersion curve) goes to zero. Minimum dispersion wavelength is defined as:

$$\sum_i \frac{-2 B_i C_i (-C_i - 3\lambda^2)}{(\lambda^2 - C_i)^3} = 0 \qquad \text{Equation 10}$$

Using the above findings, it is possible to attain a new techniques for selecting materials and designing optical systems for use in multispectral detector systems.

In accordance with aspects of the present invention, new glass map, differing from the conventional glass map (where materials are plotted as $\gamma^* v$ vs. $v$) incorporates instantaneous dispersion. Accordingly, the vertical axis of the glass map is $\gamma^*$instantaneous $v$. Specifically the instantaneous Abbe number of a material is defined by the value at peak wavelength (where the peak wavelength occurs at the location where the partial dispersion goes to zero).

Surprisingly, the inventors determined that, although the use of instantaneous dispersion was appropriate, the use of a map defined as $\gamma^*$instantaneous $v$ vs. instantaneous $v$ proved ineffective. In particular, the use of instantaneous $v$ on the horizontal axis was ineffective.

Figure 2:
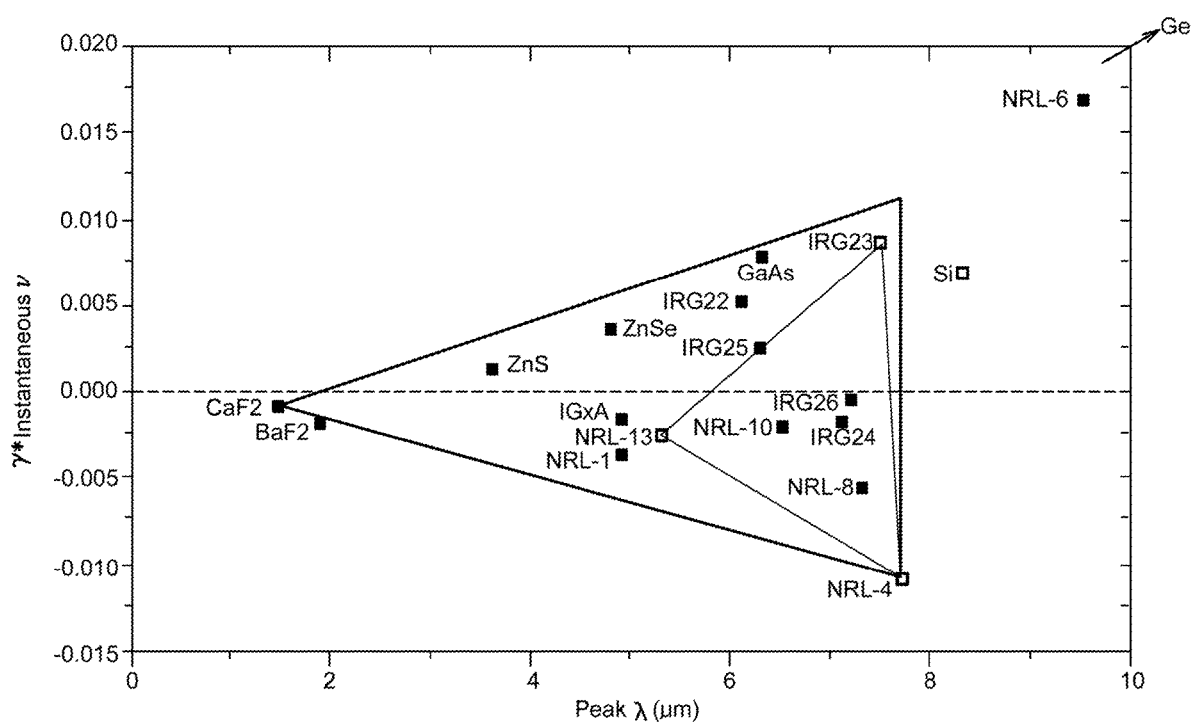
FIG. 2 is a graphical representation of a representative set of glasses useful to select materials to design an athermalized and achromatized optical system.

Instead the inventors determined that a map using the product $\gamma^* v$ for each material vs. each material's peak wavelength was more effective. FIG. 2 is a graphical representation of $\gamma^*$instantaneous $v$ vs. peak wavelength for selected materials. In particular, the inventors determined that, because instantaneous Abbe is defined at its peak wavelength, plotting the glass map against is peak wavelength allows for a visual method for selecting glasses that have large separation in wavelengths. It is to be appreciated that the glasses included in the glass map are representative, and optical systems according to aspects of the present invention may be designed using other currently-available glasses (i.e., glasses not on the map) or material yet to be developed.

As set forth in greater detail below, the glass map of FIG. 2 facilitates a graphical technique of identifying a set of glasses that comport with Equation 5a-5c so as to achieve athermalization and achromatization.

Using a glass map as shown in FIG. 2, optical systems can be constructed that reduce axial chromatic aberration and thermal focal shift. To construct a triplet, two glasses are selected that are widely separated in $\gamma^*$instantaneous $v$, the glasses having a same peak wavelength as one another. A third material having a peak wavelength that is widely separated from the peak wavelengths of the first and second materials, to facilitate achromatization. In order for a solution to be athermalized, the $\gamma^*$instantaneous $v$ values of the three glasses are selected to sum to about zero.

To design an optical system, a glass map as set forth above may be provided or generated. To generate a map, glasses that transmit light in the selected wavelength spectrum are identified and placed on the map according to their γ*instantaneous υ values versus peak wavelength. As set forth above, the instantaneous Abbe number of a material is defined by the value at peak wavelength. The values may be measured, calculated, curve fitted (e.g., using a Sellmeier curve or Schott curve) and/or otherwise identified using known techniques or using known sources. Although the method is described with reference to use of a map, a map is not needed. Any suitable technique may be used to present materials available for designing an optical system.

Figure 4:
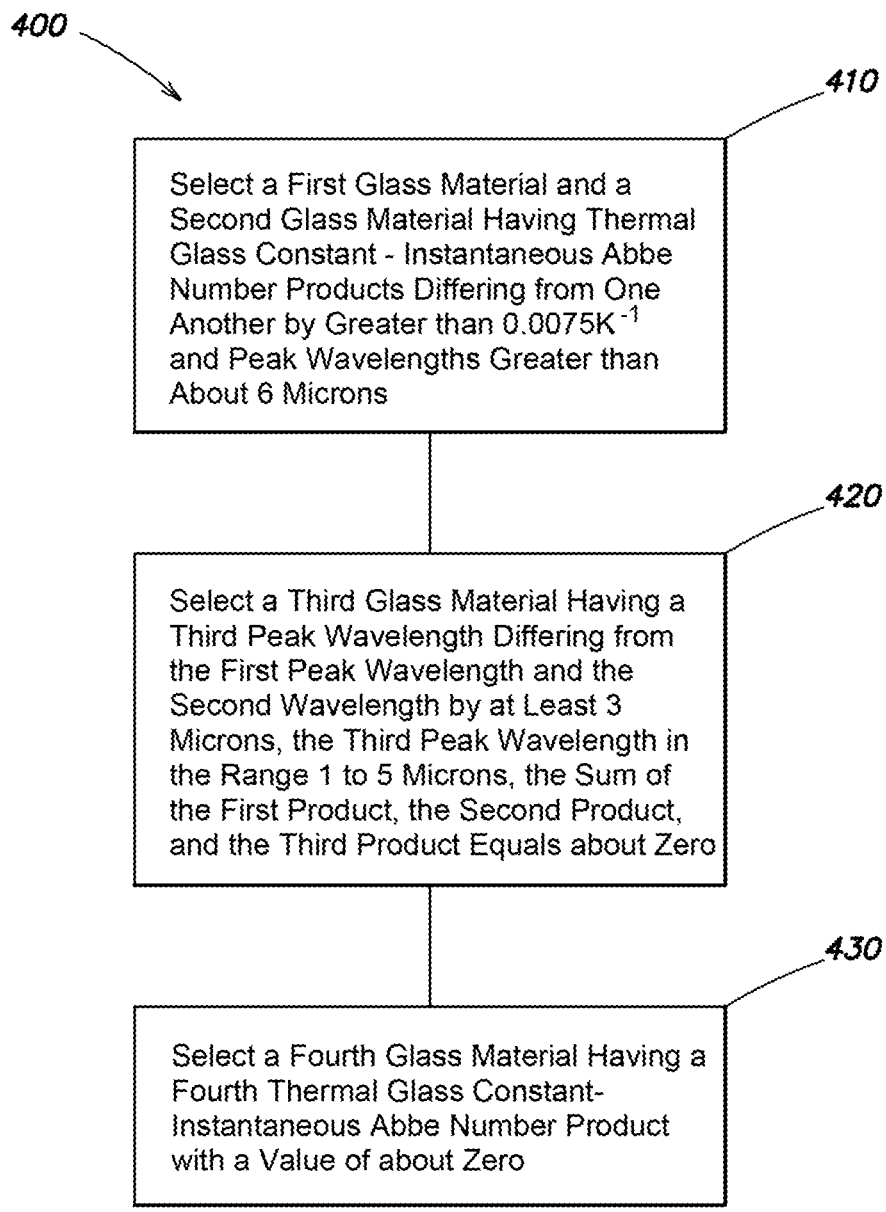
FIG. 4 is a flow chart illustrating steps of one example of an instance of a method of designing an optical system according to aspects of the present invention.

Aspects of the invention are directed to a method of designing an optical system for transmitting infrared light in a selected wavelength region. FIG. 4 is a flow chart 400 illustrating steps of one example of an instance of a method of designing an optical system according to aspects of the present invention. The method comprises the following steps in which glasses transmitting light in the selected wavelength region are chosen.

At step 410, a first glass material is selected that is characterized by a first thermal glass constant-instantaneous Abbe number product (referred to below as the first product) and a first peak wavelength. A second glass material that is characterized by a second thermal glass constant-instantaneous Abbe number product (referred to below as the second product) and a second peak wavelength.

The first glass material and the second glass material are selected such that the first product and the second product differ from one another by greater than 0.0075 K$^{-1}$. It is to be appreciated that if the difference is less than about 0.0075 K$^{-1}$ it becomes more difficult to balance the system to achieve an optical system having achromatic focal characteristics, and additional element/materials may be needed to achieve the balancing desirable for athermization.

At step 420, a third glass material characterized by a third thermal glass constant-instantaneous Abbe number product (referred to herein as the third product) and a third peak wavelength. The third glass material is selected such that the third peak wavelength differs from the first peak wavelength and the second wavelength by at least 3 microns to allow achromatization to be achieved. The first peak wavelength and second peak wavelength are greater than about 6 microns and the third peak wavelength is in the range 1 to 5 microns. Selection of the above wavelength ranges allows for adequate light transmission of the various glass materials in the selected region. As is apparent from FIG. 2, a maximum attainable peak wavelength by currently known materials is about 10 microns. A tolerance of plus-or-minus 0.5 microns is placed on the wavelength values to account for variations in measured values.

To achieve athermalization, the material are selected such that the sum of the first product, the second product, and the third product is about zero. It will be appreciated that some deviation from zero is acceptable, for example, plus or minus 0.003 K$^{-1}$.

In some instances, as shown in step 430, a fourth glass material is selected having a fourth thermal glass constant-instantaneous Abbe number product (referred to herein as the fourth product) and a fourth peak wavelength. The fourth product is selected such that the sum of the products of the four materials has a value of about zero. It will be appreciated that, if the sum of the products of the first three materials equals zero, it is typically desirable that the value of the fourth product is selected to be about zero. Typically the fourth material is selected to have a peak wavelength about the same value as the first and second materials (i.e., +/−1.0 micron therefrom). In some embodiments, the fourth material may be selected as being disposed on a side of a triangle formed with the first, second and third materials as vertices in a glass map as shown in the map shown in FIG. 2.

As would be appreciated by one of ordinary skill in the art, once materials are selected in the manner set forth above, curvatures and thicknesses of lens elements to achieve achromatization of the resulting athermal and achomatized optical system can be achieved using conventional lens design techniques for example using Code V from Synopsys, Inc. of Mountain View, Calif. or Zemax from Zemax, LLC of Kirkland, Wash. or another suitable lens design application.

Figure 5:
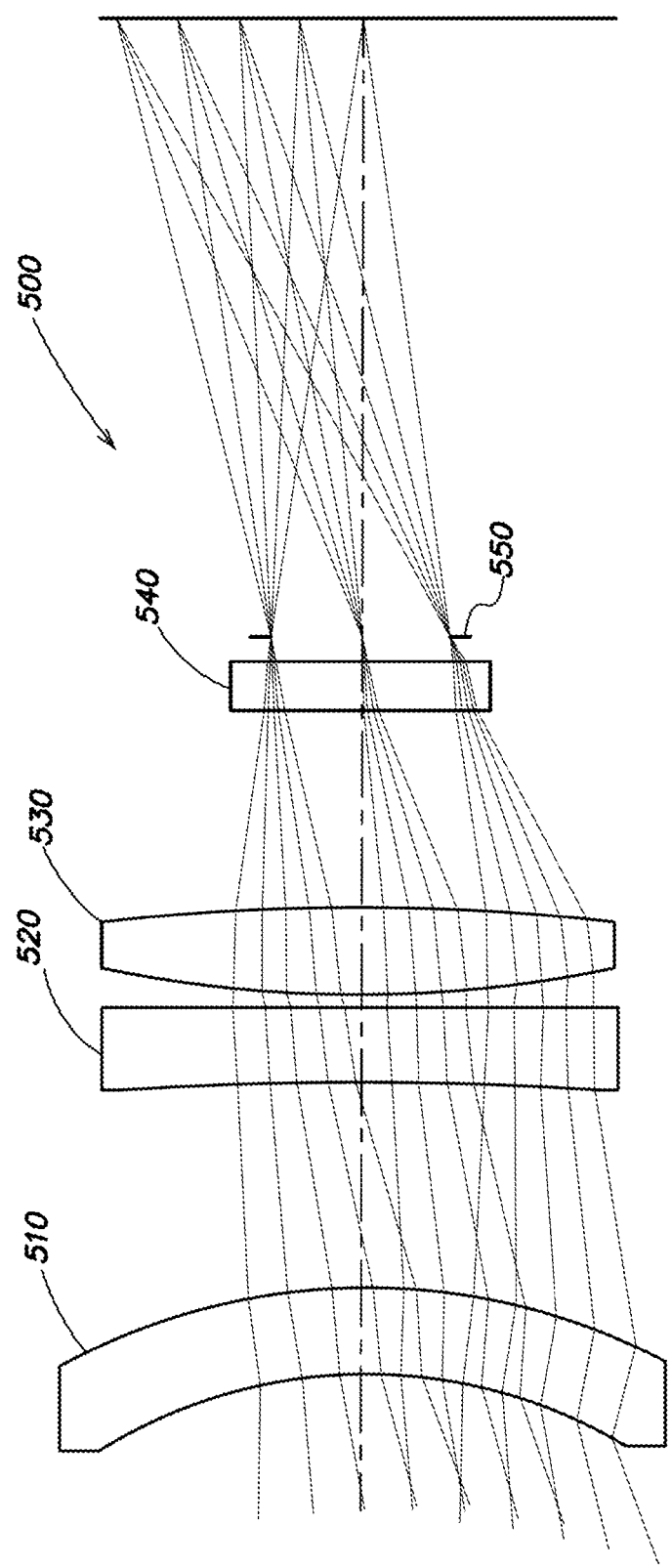
FIG. 5 is a schematic illustration of an example of an embodiment of a optical system according to aspects of the present invention.

Another aspect of the invention is directed to optical systems for transmitting infrared light, the system comprising a first glass element, a second glass element and a third glass element. FIG. 5 is a schematic illustration of an example of an embodiment of an optical system 500 comprising a first element 510, a second element 520, a third element 530, a window 540 and an aperture 550, according to aspects of the present invention.

The first glass element has a first thermal glass constant-instantaneous Abbe number product (referred to herein as the first product) and a first peak wavelength. The second glass element has a second thermal glass constant-instantaneous Abbe number product (referred to herein as the second product) and a second peak wavelength. The first product and the second product differ from one another by greater than 0.0075 K$^{-1}$. Each of the first peak wavelength and the second peak wavelength have a value greater than about 6 microns.

The third glass element has a third thermal glass constant-instantaneous Abbe number product (referred to herein as the third product) and a third peak wavelength. The third peak wavelength is in the range 1 to 5 microns and differs from the first peak wavelength and the second wavelength by at least 3 microns.

The sum of the first product, the second product, and the third product is equal to about zero. Ranges on various values set forth above with respect the method aspects set forth above apply to the system aspects of the invention that are described above. A system may comprise a fourth element selected using a method as set forth above.

For example, optical systems according to aspects of the present invention can be formed of three elements with air spaces formed between each of the elements. However, in some embodiments, two of the lenses may be fused or cemented together (i.e., have an air gap of zero therebetween) to form a doublet, and in some embodiments, three lenses may be cemented or fused together.

It will be appreciated that materials and/or elements of a two-element optical system can be selected to meet the conditions set forth above (within the identified tolerances). However, it will be appreciated that the first product and the second product can be separated by a smaller amount than in the three element embodiments. In particular a two-element system can be designed such that (1) the peak wavelength of the first element and the peak wavelength of the second element differ by at least 3 microns to allow achromatization to be achieved; (2) the peak wavelength of the first element is greater than about 6 microns and the peak wavelength of the second element is in the range 1 to 5 microns; (3) the sum of the thermal glass constant-instantaneous Abbe number products of the two elements is about zero; and (4) the first thermal glass constant-instantaneous Abbe number product and the second thermal glass constant-instantaneous Abbe number product differ from one another by greater than 0.0025 K$^{-1}$. Accordingly, an athermalized and achromatized doublet can be formed using the teachings of the method of design and the optical system aspects of the present invention as set forth above.

Example 1—An Optical System Operating Over Wavelength Range of 3-12 μm

| The system having the following characteristics- | |
| --- | --- |
| EFL | 28.5 mm |
| F/# | 3.5 |
| FFOV | 20° |
| MTF at 20 lp/mm | >35% |
| Back Working Distance | 8 mm |
| F/# | 3.5 |
| Distance to Cold Stop | 25 mm |

Using the techniques outlined above, the materials IRG23, NRL-4 and NR-13 were selected. The optical system specifications listed above represent a generic wide-field-of-view lens for a suitably-cooled detector. To select curvatures, thicknesses and spacings, a flat weighting of performance across the range 3 μm to 12 μm was used. The aperture/cold stop was selected to be located 25 mm above the detector. A window separating the cold stop and lens was also included.

Figure 3A:
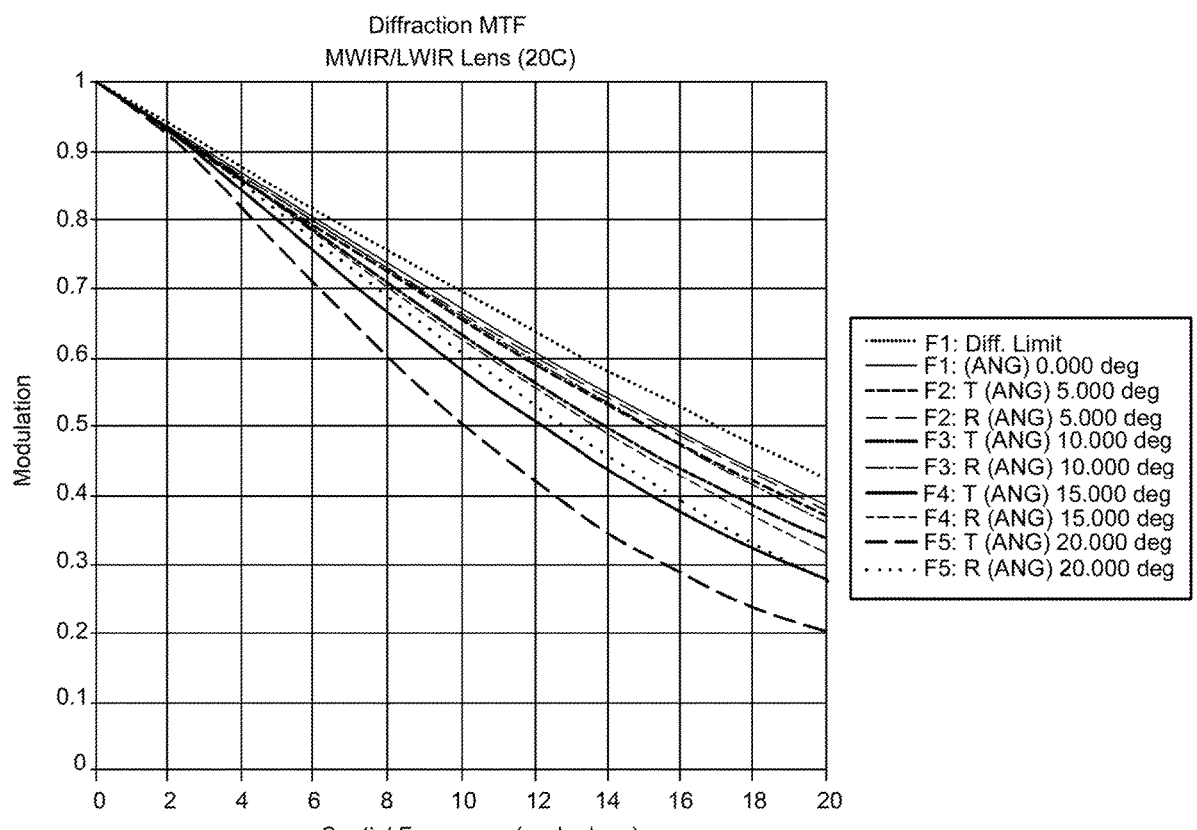
FIGS. 3a-3c are graphical representations of the calculated MTF results of an example of an achromatized and thermalized optical system plotted from 0 to 20 lp/mm at −40° C., 20° C. and 85° C., respectively.
Figure 3B:
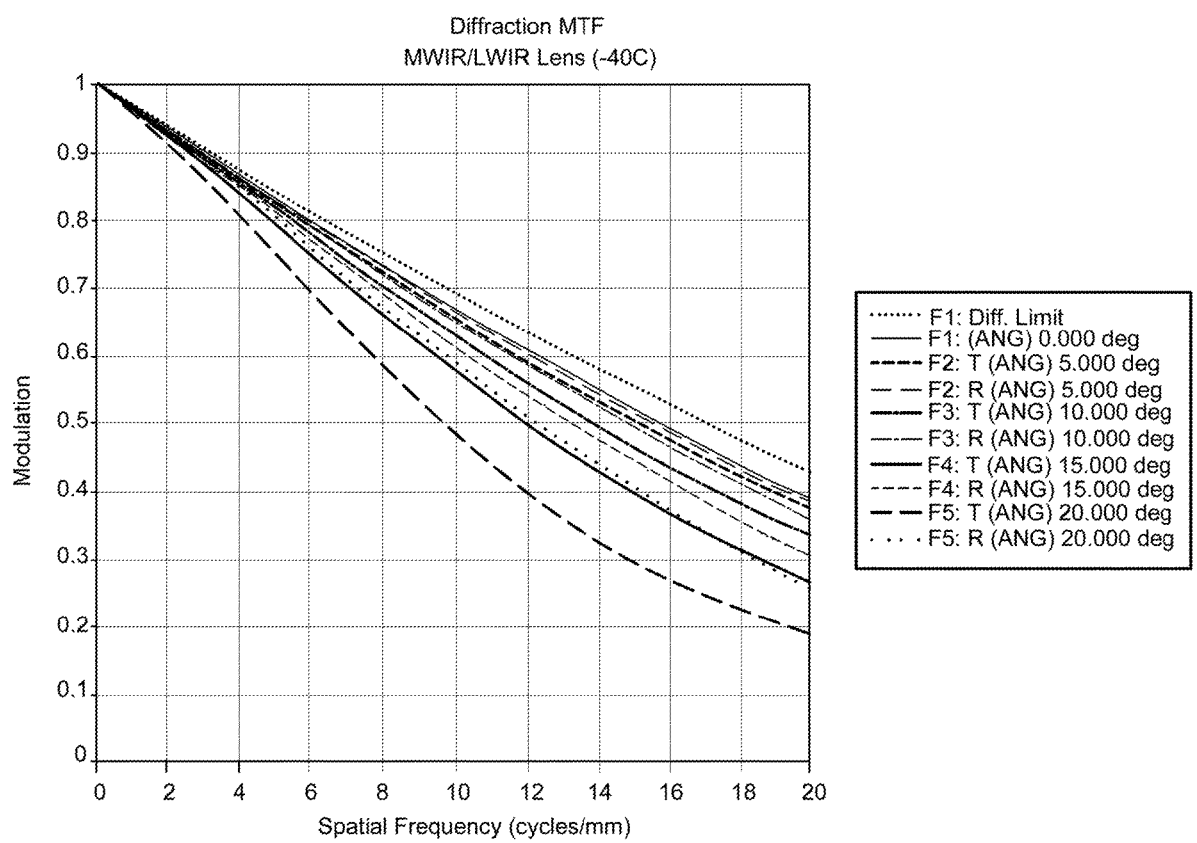
Figure 3C:
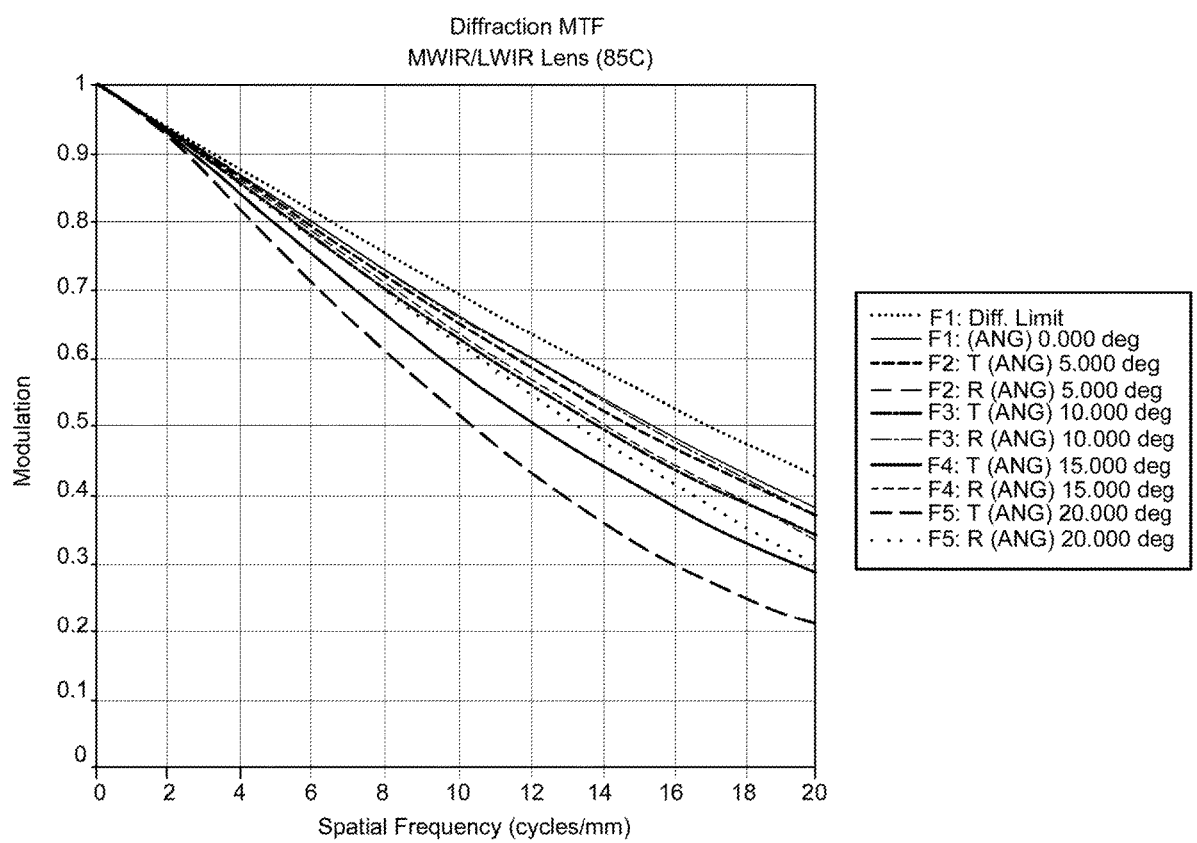

After optimization an example of an optical system having the above-specified characteristics resulted. Details of the optical system are shown in FIG. 6. The optical system was evaluated over the thermal range of −40° C. to 85° C. FIG. 3a-3c are graphical representations of the calculated MTF results plotted from 0 to 20 lp/mm at −40° C., 20° C. and 85° C., respectively. It is apparent that between 20° C. and −40° C., only small changes in the lens performance are visible. This is a result of a small amount of thermal defocus that is present in the system. A similar thermal defocus is also present when comparing the performance at 20° C. and at 85° C. This thermal focal shift is on the order of ±0.02 mm and is well within the depth of focus of the system, which is 0.2 mm.

FIG. 7 is a chart showing other examples of combinations of materials suitable for forming optical systems according to aspects of the present invention. The list of combinations is representative, and is based on a limited, representative set of materials. As set forth above, embodiments of lenses according to aspects of the invention may include other suitable existing or yet to be developed materials. Although, in FIG. 7, systems for the MWIR/LWIR range are triplets and systems for the SWIR/MWIR range are doubles, it is to be appreciated that this occurrence is the result of the materials selected for the set of materials to be used (e.g., the set of material present in map); however, the invention is not so limited and systems of 2 or more lenses could be designed for either band with appropriate selection and/or development of material.

The various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. An optical system for transmitting infrared light, comprising:
   a first glass element having a first thermal glass constant-instantaneous Abbe number product and a first peak wavelength;
   a second glass element having a second thermal glass constant-instantaneous Abbe number product and a second peak wavelength, the first thermal glass constant-instantaneous Abbe number product and the second thermal glass constant-instantaneous Abbe number product differing from one another by greater than 0.0075 K$^{-1}$, each of the first peak wavelength and the second peak wavelength being greater than about 6 microns; and
   a third glass element having a third thermal glass constant-instantaneous Abbe number product and a third peak wavelength, the third peak wavelength differing from the first peak wavelength and the second wavelength by at least 3 microns, the third peak wavelength being in the range 1 to 5 microns;
   the sum of the first thermal glass constant-instantaneous Abbe number product, the second thermal glass constant-instantaneous Abbe number product, and the third thermal glass constant-instantaneous Abbe number product being about zero.

2. The system of claim 1, wherein at least two of the first element, the second element and the third element are cemented together or fused.

3. The system of claim 1, wherein the first peak wavelength and the second peak wavelength are both less than 10 microns.

4. The system of claim 1, further comprising a fourth glass element having a fourth thermal glass constant-instantaneous Abbe number product and a fourth peak wavelength, the fourth thermal glass constant-instantaneous Abbe number product being equal to about zero.

5. A method of designing an optical system for transmitting infrared light in a selected wavelength region, comprising:
   a) selecting a first glass material having a first thermal glass constant-instantaneous Abbe number product and a first peak wavelength;
   b) selecting a second glass material having a second thermal glass constant-instantaneous Abbe number product and a second peak wavelength, the first thermal glass constant-instantaneous Abbe number product and the second thermal glass constant-instantaneous Abbe number product differing from one another by about 0.0075 K$^{-1}$, each of the first peak wavelength and the second peak wavelength being greater than about 6 microns; and
   c) selecting a third glass material having a third thermal glass constant-instantaneous Abbe number product and a third peak wavelength, the third peak wavelength differing from the first peak wavelength and the second wavelength by at least 3 microns, the third peak wavelength being in the range 1 to 5 microns, the sum of the first thermal glass constant-instantaneous Abbe number product, the second thermal glass constant-instantaneous Abbe number product, and the third thermal glass constant-instantaneous Abbe number product being about zero.

6. The method of claim 5, further comprising selecting curvatures and thicknesses for each of the first material, the second material and the third material to achieve a first glass element, a second glass element and a third glass element.

7. The method of claim 6, wherein an air gap between at least two of the first element, the second element and the third element is selected to be equal to zero.

8. The method of claim 5, wherein the steps a)-c) are performed with each of the first material, the second material and the third material being selected using a map where each of a set of materials is displayed as γ*instantaneous υ vs. peak wavelength.

9. The method of claim 5, further comprising generating a glass map including materials that transmit light in the selected wavelength region, the materials plotted according to γ*instantaneous υ and peak wavelength.

10. The method of claim 5, further comprising selecting a fourth glass material having a fourth thermal glass constant-instantaneous Abbe number product and a fourth peak wavelength, the fourth thermal glass constant-instantaneous Abbe number product having a value of about zero.

11. An optical system for transmitting infrared light having only two glass elements, the system comprising:

a first glass element having a first thermal glass constant-instantaneous Abbe number product and a first peak wavelength greater than about 6 microns;

a second glass element having a second thermal glass constant-instantaneous Abbe number product and a second peak wavelength in the range 1 to 5 microns, the first thermal glass constant-instantaneous Abbe number product and the second thermal glass constant-instantaneous Abbe number product differing from one another by greater than 0.0025 $K^{-1}$, the second peak wavelength differing from the first peak wavelength by at least 3 microns, the sum of the first thermal glass constant-instantaneous Abbe number product and the second thermal glass constant-instantaneous Abbe number product being about zero.

12. The system of claim 11, wherein the first element and the second element are cemented together or fused.

13. The system of claim 11, wherein the peak wavelength of the first element is less than 10 microns.

* * * * *